UNITED STATES PATENT OFFICE.

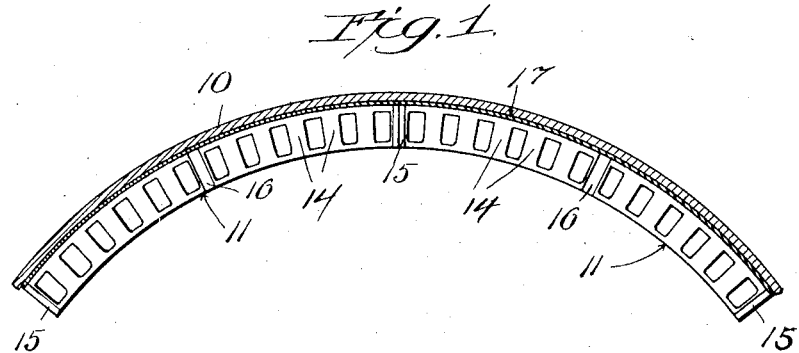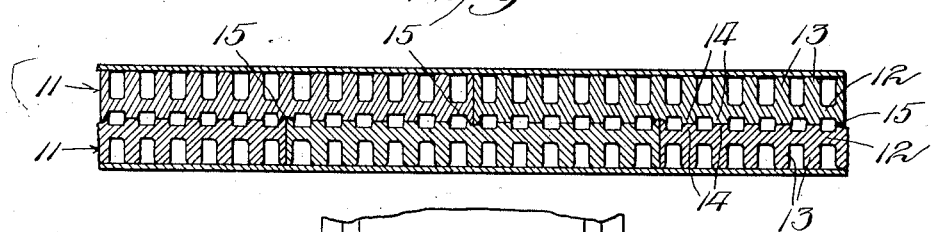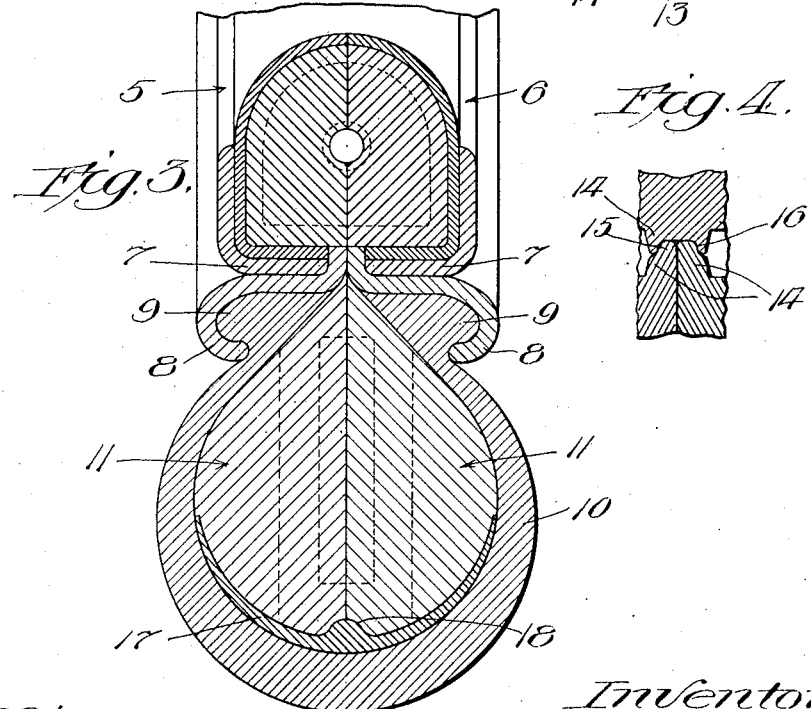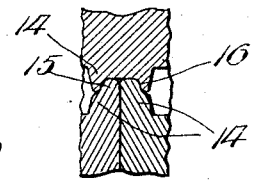

WILLIAM SEIDEL, OF CHICAGO, ILLINOIS.

TIRE FOR WHEELS.

1,344,773.   Specification of Letters Patent.   Patented June 29, 1920.

Application filed October 8, 1917. Serial No. 195,327.

*To all whom it may concern:*

Be it known that I, WILLIAM SEIDEL, a citizen of the United States, residing at Chicago, in the county of Cook and State of Illinois, have invented certain new and useful Improvements in Tires for Wheels, of which the following is a specification.

This invention relates to a tire for vehicle wheels, being concerned particularly with the construction of a filling element for a tire casing whereby the use of an elastic medium under pressure is dispensed with In the present invention I make use of an outer casing, such as is ordinarily a component part of a pneumatic tire. Interiorly of this casing I employ a filler consisting of elements formed of rubber, or other suitable cushion material, affording the required degree of resiliency and strength. As will be more fully explained hereafter, the filler element of my tire is designed with reference to cheapness of construction, lightness in weight without sacrifice of strength, and durability in service, and with these objects in view, my invention consists of the numerous features of construction and their combinations of parts, all as more clearly exhibited in the several figures of the drawing, wherein—

Figure 1 represents a longitudinal section transversely of the wheel axis, taken centrally through a tire casing, showing two of the segmental fillers arranged operatively therewithin;

Fig. 2 is a horizontal section taken at right angles to that of Fig. 1, the tire being represented as flattened for purposes of convenience;

Fig. 3 is an enlarged transverse section through the tire and rim on which it is mounted; and Fig. 4 is a detail of the connection between the ends of two adjoining filler sections.

The general construction of wheel which I prefer to employ with the present tire is best shown in Fig. 3, consisting of complementary sections 5 and 6 suitably fastened or bolted together, and each carrying a reinforcing rim 7 to which is secured a tire rim 8 adapted to grip base flanges 9 of a tire casing 10 of conventional design. The particular form of wheel described is not essential, however, to my invention, since I contemplate the use of any ordinary standard tire casing held in place upon the wheel by suitable flanges or rims which may or may not be demountable.

Interiorly of the tire casing are arranged a plurality of cushion elements, each of which is designated generally by the numeral 11. These elements, in the form illustrated, are of segmental shape arranged to lie in courses around the wheel, two courses being preferred, one on each side of the medial line of the tire. It is not essential, however, that cushion elements be formed of segmental shape, nor that a plurality of them be employed, since the same results and advantages may be obtained if but a single cushion element extending clear around the wheel be employed on each side of the tire.

The cushion elements 11, best shown in Figs. 1 and 2, each consist of a body portion 12, upon the outer side of which are formed a series of webs 13 having a suitable contour to fill up the space within the tire casing. Formed upon the inner side of the cushion body are a series of webs 14, preferably in alinement with the webs 13 on the outer side. The inner and outer peripheral sides of the cushions are extended inwardly to a distance the same as the webs 14. The end webs 14 are each provided with a projecting tongue 15 adapted to register and lie within a complementary groove 16 formed in one of the webs 14 intermediate the ends. Preferably the grooves 16 are formed in webs which are situated midway between the ends of the segment so that when assembled the cushion segments will break joints with each other in the manner best shown in Fig. 2, two of the tongues 15 lying within one of the grooves 16 when arranged in this manner.

If the standard form of tire casing be used, I prefer to secure a strip 17 upon the inner side of its outer periphery, as best shown in Fig. 3, this strip having an inwardly projecting rib 18 in the center line thereof. The cushion elements which are each recessed upon their outer peripheries to accommodate the rib 18, are definitely positioned and maintained in their courses by this means.

The construction which I have described provides a filler within the tire casing, which affords a high degree of resiliency and which may be readily and cheaply applied for use. On account of the web construction employed to reinforce the body of each segmental section, sufficient strength is imparted to the filler to withstand the strains to which the tire will ordinarily be put. At the same time this construction enables the filler to be comparatively light so as to not add excessive weight to the tire, nor undue cost to the filler.

I claim:

1. A vehicle tire comprising, in combination, an outer casing, and filler elements of segmental shape within the casing arranged in courses in break joint fashion one on each side of the tire, each filler element comprising a body portion, a plurality of outwardly disposed webs, and a plurality of inwardly disposed webs, the outer webs being arranged to engage with the inner side of the casing and the inner webs in one course of filler elements being arranged to engage with the corresponding parts on the filler elements in the other course, and means for preventing movement of the filler elements relative to each other, substantially as described.

2. A vehicle tire comprising, in combination, an outer casing, and filler elements of segmental shape within the casing arranged in courses in break joint fashion one on each side of the tire, each filler element comprising a body portion, a plurality of outwardly disposed webs, and a plurality of inwardly disposed webs, the outer webs being arranged to engage with the inner side of the casing and the inner webs in each course being arranged in abutting relation with those in the other course, substantially as described.

3. A vehicle tire comprising, in combination, an outer casing, and filler elements therewithin arranged in courses, the elements in each course each having a plurality of outwardly disposed webs and a plurality of inwardly disposed webs, there being means for preventing movement of the filler elements relative to each other, substantially as described.

4. A vehicle tire comprising, in combination, an outer casing, filler elements arranged therewithin in courses, the elements in each course being provided with a plurality of outwardly disposed webs arranged to engage with the inner side of the tire casing, and with a plurality of inwardly disposed webs arranged to engage with the corresponding webs in the other course, and an inwardly projecting peripheral rib arranged interiorly of the tire casing adapted to engage with the filler elements in each course to hold the same in proper position, substantially as described.

5. A vehicle tire embodying in combination an outer casing and a cushion filler within the casing, the filler consisting of elements arranged in courses around the tire, the portions of the elements adjacent to the interior side of the casing being recessed at intervals to present a series of webs in abutting relation to the casing, and the portions of the elements adjacent to each other being recessed at intervals to present a series of webs in abutting relation to each other, substantially as described.

WILLIAM SEIDEL.